United States Patent
Carlton

(10) Patent No.: US 6,766,410 B1
(45) Date of Patent: Jul. 20, 2004

(54) SYSTEM AND METHOD FOR REORDERING FRAGMENT DATA BASED UPON RASTERIZATION DIRECTION

(75) Inventor: Stewart Carlton, Harvest, AL (US)

(73) Assignee: 3Dlabs, Inc., Ltd., Hamilton (BM)

( * ) Notice: Subject to any disclaimer, the term of this patent is extended or adjusted under 35 U.S.C. 154(b) by 222 days.

(21) Appl. No.: 10/166,155

(22) Filed: Jun. 10, 2002

Related U.S. Application Data

(60) Provisional application No. 60/346,521, filed on Jan. 8, 2002.

(51) Int. Cl.[7] .............................................. G06F 12/00
(52) U.S. Cl. ...................... 711/105; 711/105; 711/154; 345/530; 345/536; 345/539; 345/540; 345/558; 345/559; 345/564; 345/613; 345/614
(58) Field of Search .......................... 711/105; 345/530, 345/536, 539, 540, 558, 559, 564, 613, 614

(56) References Cited

U.S. PATENT DOCUMENTS

| | | | | |
|---|---|---|---|---|
| 5,680,156 A | 10/1997 | Gove et al. | ................... | 345/154 |
| 5,721,857 A | 2/1998 | Glew et al. | ................... | 395/401 |
| 5,758,051 A | 5/1998 | Moreno et al. | ............. | 395/181 |
| 5,938,763 A | 8/1999 | Fimoff et al. | ............... | 712/300 |
| 6,003,119 A | 12/1999 | Silberman et al. | .......... | 711/168 |
| 6,415,374 B1 | * 7/2002 | Faue et al. | ................... | 711/173 |
| 6,573,928 B1 | * 6/2003 | Jones et al. | ................... | 348/51 |
| 2001/0054135 A1 | * 12/2001 | Matsuda | ..................... | 711/167 |

* cited by examiner

Primary Examiner—Donald Sparks
Assistant Examiner—Bao Q. Truong
(74) Attorney, Agent, or Firm—Arnall Golden Gregory LLP; Li K. Wang

(57) ABSTRACT

A system and method for reordering data fragments to facilitate reads from a DDR SDRAM where the fragments are placed into a first and second data fragment buffer such that the data fragments are in sequential addresses whereby the second data read on the trailing edge of the clock cycle will read the proper data fragment.

14 Claims, 2 Drawing Sheets

SYSTEM AND METHOD FOR REORDERING FRAGMENT DATA BASED UPON RASTERIZATION DIRECTION

CROSS-REFERENCE TO RELATED APPLICATION

This application claims the benefit of U.S. Provisional Application Serial No. 60/346,521, filed Jan. 8, 2002.

BACKGROUND OF THE INVENTION

1. Field of the Invention

The present invention generally relates to computer systems. More particularly, the present invention relates to a system and method of processing graphics-related data through re-ordering fragment data based on rasterization direction to line up with a DDR-SDRAM addressing order.

2. Description of the Related Art

In traditional graphics rendering, the last stage of rendering is referred to as rasterization. The rasterization stage of rendering converts transformed primitives into pixel values, and generally stores them in a frame buffer. Rasterization requires the calculation of each primitive's contribution to each pixel. In a software rendering system, rasterization can be performed in two orders: primitive by primitive (object order), or pixel by pixel (image order). Most systems rasterize in object order, using a z-buffer algorithm to computer visibility.

In high data rate applications such as graphics rendering, processing data is preferably handled through fast data transfer components, such as a Double-Data-Rate (DDR) Synchronous Dynamic Random Access Memory (DDR-SDRAM or DDR). A DDR SDRAM differs from a standard DRAM (or SDRAM) in that it uses a separate strobe signal by which some or all of its data timing is referenced, and both the rising and the falling edges of the strobe signal are used to clock data into its destination. Using both edges of the strobe signal to transfer data thus doubles the amount of data transferred in a given time interval.

In rasterization with a DDR SDRAM, a problem arises in that the DDR SDRAM is only provided one address per clock cycle. Accordingly, the data received from the DDR SDRAM will typically come from the first address (n) and then from the next logical address (n+1). However, in some applications, the data does not logically flow from the addresses n to n+1, and the second data fragment read on the trailing edge clock signal will be discarded. This problem is particularly acute in graphics rendering because different kinds of objects are being drawn which are not likely to have pure linear or otherwise intuitive data flow, or in other words, the objects may not be drawn in the same direction during rendering. The speed advantage of a DDR SDRAM can thus be lost in a graphics rendering application because the data read at n+1 is not the correct data required following the read of n and the data fragment read from n+1 must be flushed from the pipeline.

Accordingly, it would be advantageous to provide a system and method that increases efficiency though providing accurate data from the DDR SDRAM when a processor is drawing in a direction not well oriented to the DDR SDRAM addressing. Such system and method should be compatible with the rasterization data in graphics rendering whereby the data fragments can be reordered such that the correct data fragment is present at the read occurring on the trailing edge of the clock signal. It is to the provision of such a system and method of reordering data fragments that the present invention is primarily directed.

SUMMARY OF THE INVENTION

The present invention is a system and method for reordering data fragments to facilitate reads from a DDR SDRAM where the data fragments are placed into a first and second data fragment buffer such that the data fragments are in sequential addresses whereby the second data read on the trailing edge of the DDR SDRAM clock cycle will read the proper data fragment. In particular, the system includes a first data fragment buffer (n) and a second data fragment buffer (n+1), and upon presentation of a first data fragment having an address and second data fragment having an address, the system compares the first data fragment address with the second data fragment address and if the second data fragment address is the next sequentially readable data address after the first data fragment address, the system stores the first data fragment in the first data fragment buffer and the second data fragment in the second data fragment buffer. Or, if the second data fragment address is sequentially readable before the first data fragment address, the system stores the second data fragment in the first data fragment buffer and the first data fragment in the second data fragment buffer. Otherwise, if the first data fragment address and second data fragment address are non-sequentially readable, the system flushes the first (oldest) data fragment.

The system preferably flushes the first and second data fragments once they are stored in sequential order and obtains a new first and second fragment for comparison. Alternately, the system can also flush solely the first data fragment once stored, make the second data fragment the first data fragment, and obtain a new data fragment. In other words, when the second data fragment is stored in the second data fragment buffer (n+1), the system can make the second data fragment the first data fragment prior to obtaining a new data fragment to become the second data fragment. Otherwise, if the system stores the second data fragment in the first data fragment buffer (n) and stores the first data fragment in the second data fragment buffer (n+1), it can likewise make the second data fragment the first data fragment and iterate the reordering process and obtain a new second data fragment. However, the system preferably flushes both fragments upon proper sequential ordering of the fragments in the data buffers and obtains two new fragments to become the first and second data fragments and iterates the ordering process.

The first and second data fragment buffers are preferably first-in-first-out buffers. Moreover, the DDR SDRAM can read data directly from the first data fragment buffer and second data fragment buffer, or the first data fragment buffer and second data fragment buffer can each store data fragments in another storage location, prior to the data fragments being read from a DDR SDRAM.

The present invention further provides a method for reordering data fragments to facilitate reads from a DDR SDRAM using a first data fragment buffer and a second data fragment buffer including the steps of presenting a first data fragment having and address where the first data fragment is intended to be read by a DDR SDRAM, presenting a second data fragment having an address where the second data fragment is intended to be read by a DDR SDRAM, and comparing the first data fragment address with the second data fragment address. If the second data fragment address is the next sequentially readable data address after the first data fragment address, the method includes the step of storing the first data fragment in the first data fragment buffer and the second data fragment in the second data fragment buffer. And if the second data fragment address is sequentially readable before the first data fragment address, the method includes the step of storing the second data fragment in the first data fragment buffer and the first data fragment in the second data fragment buffer. Otherwise, if the first data fragment address and second data fragment address are non-sequentially readable, the method includes the step of flushing the second data fragment. The method further preferably includes the step of obtaining new data fragments to become the first and second data fragments after the data fragments have been stored in the first and second buffers.

Preferably, upon the step storing the second data fragment in the first data fragment buffer and the first data fragment in the second data fragment buffer, the method further includes the step of either flushing the first and second data fragment and obtaining two new fragments for comparison and sequencing, or making the second data fragment the first data fragment prior to obtaining a new data fragment to become the second data fragment. If so embodied, the steps of storing the first data fragment and second data fragment are storing the first data fragment and second data fragment in first first-in-first-out buffers and second first-in-first-out buffers respectively. Further, the method can either includes the step of the DDR SDRAM reading data directly from the first data fragment buffer and second data fragment buffer, or alternately, the method can further include the steps of storing data fragments from the first data fragment buffer in another storage location, and storing data fragments from the second data fragment buffer in another storage location, prior to the data fragments being read from a DDR SDRAM.

The present invention accordingly provides several advantages in a computer system utilizing DDR SDRAMs. The use of the system improves DDR SDRAM memory efficiency as erroneous reads on the trailing edge clock cycle are minimized. Further, the system reduces buffer (FIFO) storage requirements as erroneous data is not required to be buffered when errantly read, which accordingly reduces the need for cached data fragments. Finally, the system simplifies downstream logic on the system as flushes of errant data are minimized so significant downstream error checking hardware is unnecessary.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
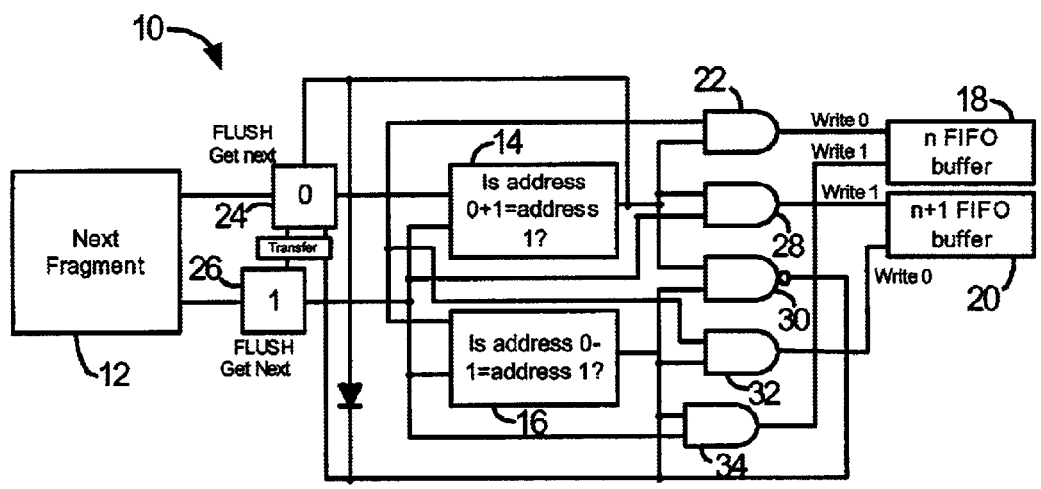
FIG. 1 is a block diagram of the circuit to reorder the fragment data addresses such that the DDR SDRAM will be able to accurately read data on both clock edges.

With reference to the figures in which like numerals represent like elements throughout, FIG. 1 illustrates a hardware embodiment of a system 10 for reordering data fragments to facilitate reads from a DDR SDRAM, or other data fragment source 12 with a first data fragment buffer 18, and a second data fragment buffer 20, with a comparison 14 of data fragment addresses for n and n+1 sequence and a comparison 16 for n and n−1 sequence. The fragment reordering circuit shown in FIG. 1 maintains a positive (incrementing) direction for issuing requests to the memory controller (not shown). Through the reordering of fragment data to have sequential addresses, the present invention successfully utilizes the DDR SDRAM bandwidth provided by reading address n and getting n+1 without the need for a cache. The present system 10 also reorders data fragments that have n and n−1 addresses such that the sequence of the addresses can be maintained. In addition, the circuit of system 10 ensures that the fragment data has been distributed into the proper FWFOs 18 or 20 for processing on both cycles of the DDR SDRAM.

In operation of the system 10, letting n be the address of the first data fragment received that has not been sent to the memory control unit, upon presentation of a first data fragment 24 address and second data fragment 26 address from a data fragment source 12, the system 10 compares the first data fragment 24 address with the second data fragment 24 address, as shown at comparison 14, to determine if the second data fragment 26 address is the next sequentially readable data address after the first data fragment 24 address, which indicates a high on AND gates 22 and 28. In other words, the system determines if fragments are adjacent in address space through checking if an n+1 or n−1 address relation is present. The system 10 then stores the first data fragment 24 in the first data fragment buffer 18 and stores the second data fragment 26 in the second data fragment buffer 20.

The system also determines, as shown at comparison 16, if the second data fragment address 26 is sequentially readable before the first data fragment24 address, which causes a high on AND gates 32 and 34, the system 10 stores the second data fragment 26 in the first data fragment buffer 18 and the first data fragment 24 in the second data fragment buffer 20. The system 10 then preferably flushes the first data fragment 24 and second data fragment 26 such that new data fragments from the data fragment source 12 can be obtained. Alternately, the system 10 can make the second data fragment 26 the first data fragment 24 prior to obtaining a new data fragment to become the second data fragment 26 to align and find another sequential data fragment for storage. Otherwise, if the first data fragment 24 address and second data fragment 26 address are non-sequentially readable, which will cause a high at NAND gate 30, the system 10 flushes at least the first data fragment 26 (or oldest data fragment), and preferably obtains a new first data fragment 26 from the data fragment source 12. The system 10 is also shown embodied here with a transfer between first data fragment 24 and second data fragment 26 wherein the system 10 can selectively switch the address of the second data fragment 26 to the first data fragment 24 when non-sequential addresses are indicated.

The first data fragment buffer 18 and second data fragment buffer 20 are preferably first-in-first-out (FIFO) buffers that provide data fragment for the DDR SDRAM reads. While the DDR SDRAM can read data directly from the first data fragment buffer 18 and second data fragment buffer 20, either the first data fragment buffer 18, the second data fragment buffer 20, or both, can store data fragments in another storage location, such as a cache or secondary buffer, prior to the data fragments being read from a DDR SDRAM. Such secondary storage however should maintain the data fragments whereby the sequence of the data fragment addresses are maintained for the DDR SDRAM reads.

Figure 2:
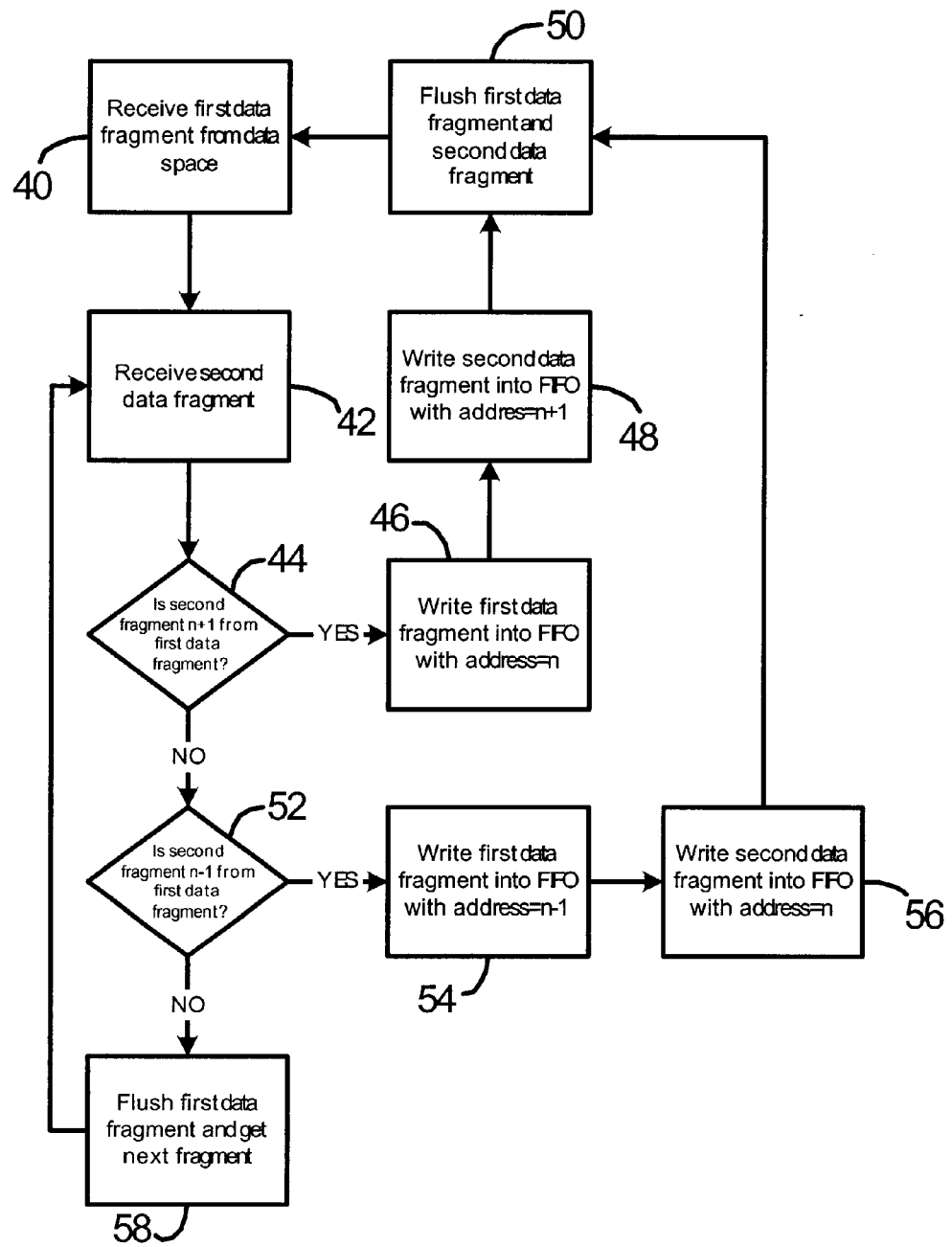
FIG. 2 is a flow chart of the process of reordering the fragment data addresses performed in either hardware, as shown in FIG. 1, or in software.

The methodology utilized to reorder the data fragments by their addresses can be implemented in hardware, as shown in the circuit of FIG. 1, or in software executing on a hardware platform utilizing the process shown in FIG. 2. The flowchart of FIG. 2 illustrates the preferred method for reordering data fragments to facilitate reads from a DDR SDRAM using a first data fragment buffer 18 and a second data fragment buffer 20 including the steps of receiving a first data fragment 24 having and address where the first data fragment is intended to be read by a DDR SDRAM, as shown at step 40, then receiving a second data fragment 26 having an address where the second data fragment 26 is intended to be read by a DDR SDRAM, as shown at step 42. Then a comparison is made of the first data fragment 24 address with the second data fragment 26 address to determine if the second data fragment 26 address (n+1) is the next sequentially readable data address after the first data fragment 24 address (n), as shown at decision 44. If the addresses are sequential at decision 44, then the first data fragment 24 is stored in the first data fragment buffer 18 with address n, as shown at step 46, the second data fragment 26 is stored in the second data fragment buffer 20 with address n+1, as shown at step 48, and the first and second data fragments are flushed, as shown at step 50, and the process returns to step 40 to obtain new first and second data fragments and iterate the data fragment reordering sequence.

If the addresses are not sequential at decision 44, then a comparison is made to determine if the second data fragment 26 address is sequentially readable before the first data fragment 24 address, as shown at decision 52. If the second data fragment 26 address is before the first data fragment 24 address at decision 52, then the first data fragment 24 is stored in the second data fragment buffer 20 (address n), as shown at step 54, and the second data fragment 26 is stored in the first data fragment buffer 18 (address n−1), as shown at step 56. The first and second data fragments are flushed, as shown at step 50, and the process returns to step 40 to obtain new first and second data fragments and iterate the data fragment reordering sequence. Alternately, at step 50, the second data fragment 26 is flushed from the system 10 and the next fragment is obtained to replace the second data fragment 26, and the process returns to step 40 to iterate the reordering of data fragments.

Otherwise, if the second data fragment 26 address is not before the first data fragment 24 address at decision 52, then the first data fragment 24 address and second data fragment 26 address are non-sequentially readable and the first data fragment 26 is flushed from the system 10 and the next fragment is obtained, as shown at step 58, and the process iterates and returns to step 40. After the sequence has either stored or flushed the data fragments, new data fragments are preferably obtained to become the first data fragment 24 and second data fragment 26 whereby a new iterative reordering process is begun to eventually sequence all of the data for the DDR SDRAM, if possible.

The step storing the second data fragment 26 in the first data fragment buffer 18 and the first data fragment 24 in the second data fragment buffer 20 can further include the step of making the second data fragment 26 the first data fragment 24 prior to obtaining a new data fragment to become the second data fragment 26, which can be accomplished by the transfer therebetween in FIG. 1, to then iterate and obtain the next sequential data fragment to the now ordered first data fragment 24 and second data fragment 26 as they are stored in the buffers 18 and 20 can be made. Further, the steps of storing the first data fragment 24 and second data fragment 26 are preferably storing the first data fragment 24 and second data fragment 26 in FIFO buffers, such as buffers 18 and 20.

The method can include the step of the DDR SDRAM reading ordered data fragments directly from the first data fragment buffer 18 and second data fragment buffer 20.

Alternately, the method can further include the steps of storing data fragments from the first data fragment buffer 18 in another storage location, such as a cache, and storing data fragments from second data fragment buffer 20 in another storage location, prior to the data fragments being read from a DDR SDRAM.

While there has been shown a preferred embodiment of the present invention, it is to be understood that certain changes may be made in the forms and arrangement of the elements and steps of the method without departing from the underlying spirit and scope of the invention as is set forth in the claims.

What is claimed is:

1. A system for reordering data fragments to facilitate reads from a DDR SDRAM, comprising:

a first data fragment buffer;

a second data fragment buffer; and wherein upon presentation of a first data fragment having an address and second data fragment having an address, the system comparing the first data fragment address with the second data fragment address and if the second data fragment address is the next sequentially readable data address after the first data fragment address, the system storing the first data fragment in the first data fragment buffer and storing the second data fragment in the second data fragment buffer, and if the second data fragment address is sequentially readable before the first data fragment address, the system storing the second data fragment in the first data fragment buffer and storing the first data fragment in the second data fragment buffer, otherwise if the first data fragment address and second data fragment address are non-sequentially readable, the system flushing at least the first data fragment.

2. The system of claim 1, wherein after storing the first data fragment and second data fragment, the system flushes the first and second data fragment and obtains new data fragments to become the first data fragment and second data fragment.

3. The system of claim 1, wherein upon the system storing the second data fragment in the first data fragment buffer and storing the first data fragment in the second data fragment buffer, the system making the second data fragment the first data fragment prior to obtaining a new data fragment to become the second data fragment.

4. The system of claim 1, wherein the first data fragment buffer and second data fragment buffer are first-in-first-out buffers.

5. The system of claim 1, wherein the DDR SDRAM reads data directly from the first data fragment buffer and second data fragment buffer.

6. The system of claim 1, wherein the first data fragment buffer and second data fragment buffer each store data fragments in another storage location, prior to the data fragments being read from a DDR SDRAM.

7. A system for reordering data fragments to facilitate reads from a DDR SDRAM, comprising:

a first data storage means for storing data fragments;

a second data storage means for storing data fragments; and a reordering means for reordering data fragments wherein upon presentation to the reordering means of a first data fragment having an address and second data fragment having an address, the reordering means comparing the first data fragment address with the second data fragment address and if the second data fragment address is the next sequentially readable data address after the first data fragment address, the reordering means storing the first data fragment in the first data storage means and storing the second data fragment in the second data storage means, and if the second data fragment address is sequentially readable before the first data fragment address, the reordering means storing the second data fragment in the first data storage means and storing the first data fragment in the second data storage means, otherwise if the first data fragment address and second data fragment address are non-sequentially readable, the reordering means flushing at least the first data fragment.

8. A method for reordering data fragments to facilitate reads from a DDR SDRAM using a first data fragment buffer and a second data fragment buffer, comprising the steps of:

receiving a first data fragment having and address where the first data fragment is intended to be read by a DDR SDRAM;

receiving a second data fragment having an address where the second data fragment is intended to be read by a DDR SDRAM;

comparing the first data fragment address with the second data fragment address;

if the second data fragment address is the next sequentially readable data address after the first data fragment address, storing the first data fragment in the first data fragment buffer and the second data fragment in the second data fragment buffer;

if the second data fragment address is sequentially readable before the first data fragment address, storing the second data fragment in the first data fragment buffer and the first data fragment in the second data fragment buffer; and if the first data fragment address and second data fragment address are non-sequentially readable, flushing at least the first data fragment.

9. The method of claim 8, further comprising the step of obtaining a new first data fragment and second data fragment for comparison, such step occurring after the prior first data fragment and prior second data fragment have been stored in the respective first data fragment buffer and second data fragment buffer.

10. The method of claim 8, further comprising the step of obtaining a new data fragment to become the first data fragment.

11. The method of claim 10, wherein upon the step of storing the second data fragment in the first data fragment buffer and the first data fragment in the second data fragment buffer, further comprising the step of making the second data fragment the first data fragment prior to obtaining a new data fragment to become the second data fragment.

12. The method of claim 8, wherein the steps of storing the first data fragment and second data fragment are storing the first data fragment and second data fragment in first first-in-first-out buffers and a second first-in-first-out buffer respectively.

13. The method of claim 8, further comprising the step of the DDR SDRAM reading data directly from the first data fragment buffer and second data fragment buffer.

14. The method of claim 8, further comprising the steps of storing data fragments from the first data fragment buffer in another storage location, and storing data fragments from the second data fragment buffer in another storage location, prior to the data fragments being read from a DDR SDRAM.

* * * * *